United States Patent
Lan et al.

(10) Patent No.: US 10,999,357 B1
(45) Date of Patent: May 4, 2021

(54) DATA TRANSMISSION SYSTEM AND DATA TRANSMISSION METHOD

(71) Applicant: Institute For Information Industry, Taipei (TW)

(72) Inventors: Pai-Ju Lan, Taipei (TW); Shao-Yu Ni, Taipei (TW); Hung-Ming Chen, Taipei (TW); Shih-Ying Chen, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 17/084,613

(22) Filed: Oct. 29, 2020

(30) Foreign Application Priority Data

Sep. 22, 2020 (TW) .................................. 109132755

(51) Int. Cl.
*G06F 15/173* (2006.01)
*H04L 29/08* (2006.01)

(52) U.S. Cl.
CPC .................................... *H04L 67/10* (2013.01)

(58) Field of Classification Search
CPC ...................................................... H04L 67/10
See application file for complete search history.

(56) References Cited

U.S. PATENT DOCUMENTS

| | | | |
|---|---|---|---|
| 10,528,599 B1 * | 1/2020 | Pandis | H04L 67/1097 |
| 2007/0061487 A1 * | 3/2007 | Moore | G06F 16/27 709/246 |
| 2012/0222003 A1 * | 8/2012 | Shukla | G06F 8/20 717/115 |
| 2017/0006034 A1 * | 1/2017 | Link, II | H04L 61/2514 |
| 2017/0329945 A1 * | 11/2017 | Sabiwalsky | G06F 9/546 |

* cited by examiner

*Primary Examiner* — Hua Fan
(74) *Attorney, Agent, or Firm* — Skaar Ulbrich Macari, P.A.

(57) ABSTRACT

A data transmission system and a data transmission method are disclosed. The data transmission system includes a cloud server, an edge computing device, and a gateway. The cloud server includes a schema database which stores a transmission address corresponding to a target schema. The edge computing device transmits a data receiving request message related to the target schema to the cloud server. The cloud server transmits the transmission address to the edge computing device after receiving the data receiving request message. After receiving the transmission address, the edge computing device receives at least one data value corresponding to at least one label of the target schema from the gateway according to the transmission address, and generates a target data corresponding to the target schema according to the at least one label and the at least one data value.

20 Claims, 5 Drawing Sheets

DATA TRANSMISSION SYSTEM AND DATA TRANSMISSION METHOD

PRIORITY

This application claims priority to Taiwan Patent Application No. 109132755 filed on Sep. 22, 2020, which is hereby incorporated by reference in its entirety.

FIELD

Embodiments of the present disclosure relate to a data transmission system and a data transmission method. Specifically, embodiments of the present disclosure relate to a data transmission system and a data transmission method suitable for the industrial Internet of Things (IoT).

BACKGROUND

In the operation of the existing industrial Internet of Things, a gateway may receive production data provided by a machine tool equipment in the industrial field or sensing data provided by a sensor installed in the industrial field, and normalize these data to generate normalized data in a specific format. Then, the gateway uploads the normalized data directly or indirectly to the edge computing device or the cloud server through the Internet for subsequent application by the edge computing device or the cloud server.

However, the industrial Internet of Things involves large scale of data. When the gateway executes the data format normalization procedure, it serializes the data into specific formats (e.g., JSON format and XML format), embeds the data in the schema, and then performs data transmission. Because the storage space occupied by the schema is often higher than that occupied by the data, a large amount of network bandwidth will be consumed and the cost for data transmission will be too high, which will easily affect the operation of gateways, edge computing devices and cloud servers in the industrial Internet of Things. Accordingly, an urgent need exists in the art to reduce the consumption of bandwidth for data transmission and reduce the cost for data transmission in the industrial Internet of Things.

SUMMARY

To solve at least the aforesaid problems, an embodiment of the present disclosure provides a data transmission system, and the data transmission system may comprise a cloud server, an edge computing device, and a gateway that are electrically connected with each other. The cloud server may comprise a schema database which may be configured to store a transmission address corresponding to a target schema. The edge computing device may be configured to transmit a data receiving request message related to the target schema to the cloud server. The cloud server may be configured to transmit the transmission address to the edge computing device after receiving the data receiving request message, and after the edge computing device receives the transmission address, the edge computing device may further be configured to receive at least one data value corresponding to at least one label of the target schema from the gateway according to the transmission address, and generate a target data corresponding to the target schema according to the at least one label and the at least one data value.

To solve at least the aforesaid problems, an embodiment of the present disclosure further provides a data transmission method. The data transmission method may comprise the following steps: transmitting, by an edge computing device, a data receiving request message related to a target schema to a cloud server; transmitting, by the cloud server, a transmission address corresponding to the target schema to the edge computing device after receiving the data receiving request message, wherein the transmission address is stored in a schema database of the cloud server; after the edge computing device receives the transmission address, receiving, by the edge computing device, at least one data value corresponding to at least one label of the target schema from a gateway according to the transmission address; and generating, by the edge computing device, a target data corresponding to the target schema according to the at least one label and the at least one data value.

Different from the traditional industrial Internet of Things which directly transmits complete target data (i.e., the above-mentioned normalized data, which comprises the label and data value of the target schema) through the gateway, when uploading data, the gateway of the present disclosure only transmits the data value of the target schema to the edge computing device, and does not need to transmit the label of the target schema repeatedly. After receiving the data values, the edge computing device may generate the target data corresponding to the target schema according to the pre-stored labels and the received data values. The format of the target data generated by the edge computing device corresponds to the format of the target schema, thus meeting the requirements of subsequent application or service performed by the edge computing device or the cloud server.

Accordingly, in the embodiments of the present disclosure, under the condition that the edge computing device may still obtain the target data conforming to the format of the target schema, repeated transmission of the label of the target schema is avoided, thus indeed saving the unnecessary data transmission and further reducing the bandwidth consumed by the industrial Internet of Things for data transmission.

What have described above is not intended to limit the present disclosure, but merely outlines the solvable technical problems, the usable technical means, and the achievable technical effects for a person having ordinary skill in the art to preliminarily understand the present disclosure. According to the attached drawings and the following detailed description, a person having ordinary skill in the art can further understand the details of various embodiments of the present disclosure.

BRIEF DESCRIPTION OF THE DRAWINGS

The drawings are provided for describing various embodiments, in which.

DETAILED DESCRIPTION

In the following description, the present disclosure will be described with reference to certain example embodiments thereof. However, these example embodiments are not intended to limit the present disclosure to any operations, environment, applications, structures, processes, or steps described in these example embodiments. For ease of description, contents unrelated to the embodiments of the present disclosure or contents that shall be appreciated without particular description are omitted from depiction; and dimensions of elements and proportional relationships among individual elements in the attached drawings are only exemplary examples but not intended to limit the scope of the claimed invention. Unless stated particularly, same (or similar) reference numerals may correspond to same (or similar) elements in the following description. Unless otherwise specified, the number of each element described below may be one or more while it is implementable.

Terms used in this disclosure are only used to describe the embodiments, and are not intended to limit the scope of the claimed invention. Unless the context clearly indicates otherwise, singular forms "a" and "an" are intended to comprise the plural forms as well. Terms such as "comprising" and "including" indicate the presence of stated features, integers, steps, operations, elements and/or components, but do not exclude the presence of one or more other features, integers, steps, operations, elements, components and/or combinations thereof. The term "and/or" comprises any and all combinations of one or more associated listed items.

Figure 1:
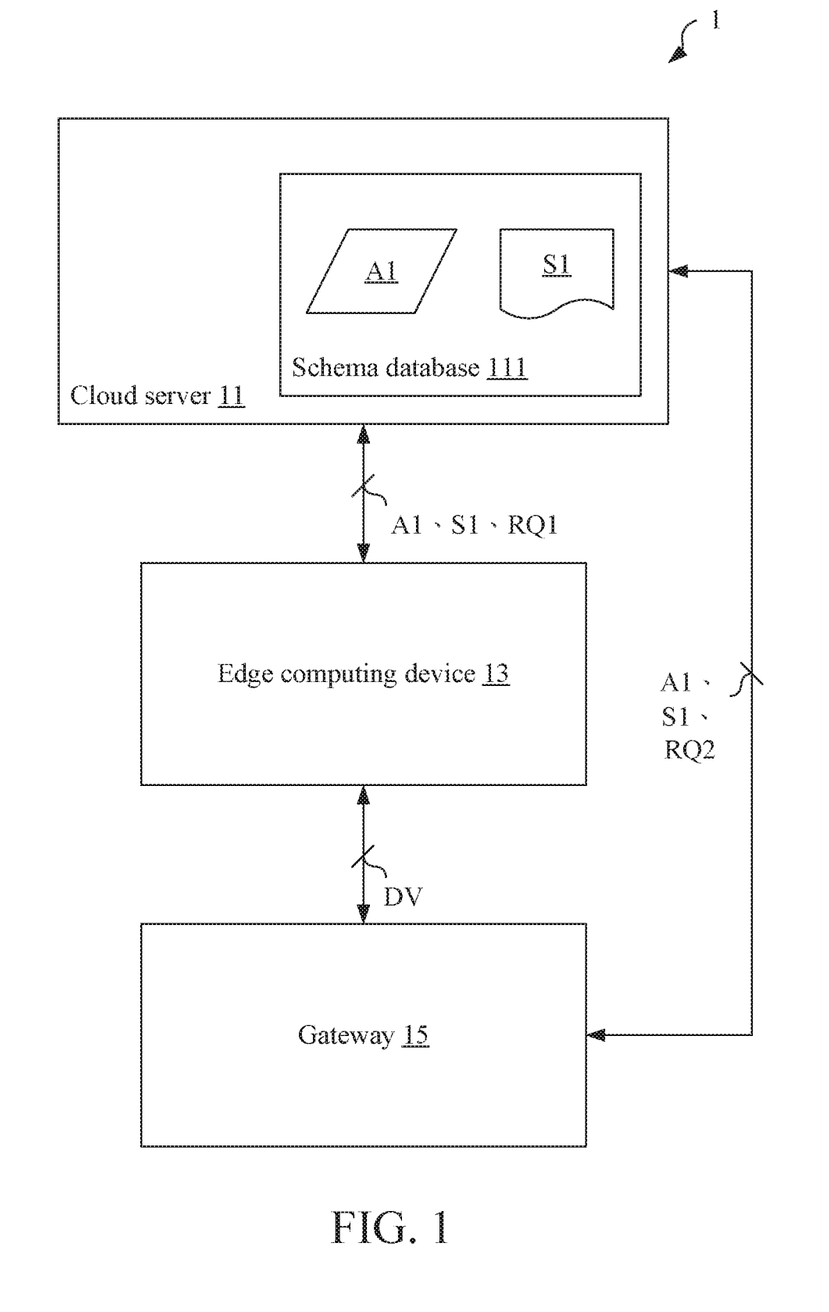
FIG. 1 illustrates a schematic view of a data transmission system according to some embodiments of the present disclosure.

FIG. 1 illustrates a schematic view of a data transmission system according to some embodiments of the present disclosure. However, the contents shown in FIG. 1 are only for illustrating embodiments of the present disclosure, but not for limiting the scope of the claimed invention.

Referring to FIG. 1, a data transmission system 1 may comprise a cloud server 11, an edge computing device 13, and a gateway 15 which are electrically connected with each other.

Each of the cloud server 11 and the edge computing device 13 may be one of various physical or virtual host or computing devices comprising a processing unit (e.g., a central processing unit, a microprocessor, a microcontroller) and a storage unit (e.g., a memory, a Universal Serial Bus (USB) disk, a hard disk, a Compact Disk (CD), a mobile disk, a database, or other various storage media or circuits with the same functions). The cloud server 11 and the edge computing device 13 may perform various logical operations through respective processing units and store the results of the operations in respective storage units. As shown in FIG. 1, the storage unit of the cloud server 11 may further comprise a schema database 111 to store a transmission address A1 corresponding to a target schema and a schema structure S1 of the target schema.

The schema database 111 may store the schema identification number and the schema structure, the filter identification number and the filter content, and the correspondence relationships between the gateway identification number, the schema identification number, the filter identification number, the data channel, and the edge computing device. The schema database 111 may back up the schema and the filter, and an edge computing device may obtain the schema structure corresponding to a specific schema from the schema database 111 according to the schema identification number of the specific schema. In some embodiments, the schema database 111 may also comprise a plurality of data fields, for example but not limited to: serial number, part number, procedure, date, time, machine, abnormal status. The schema database 111 may be established based on the above data fields. In addition, the schema database 111 may also provide "Registration function", "Query function", and "Delete function" or the like. Details of these functions will be described later.

In the data transmission system 1, the cloud server 11 may have higher computing capacity and storage capacity as compared to the edge computing device 13. Therefore, as compared to the edge computing device 13, the cloud server 11 may usually store more data and perform more complex or larger calculation. In FIG. 1, the data transmission system 1 only illustrates a single cloud server 11 and a single edge computing device 13, but it is not limited thereto. The cloud server 11 may also be connected to a plurality of other edge computing devices at the same time, and provide various services for other edge computing devices.

The gateway 15 may be one of various gateways in the industrial Internet of Things, which may serve as a data transmission bridge between the industrial field and the cloud server 11 or the edge computing device 13. In detail, the gateway 15 may receive the production data provided by the machine tool equipment in the industrial field or the sensing data provided by the sensor installed in the industrial field, perform various processing on these data, and then provide the processed data directly or indirectly to the cloud server 11 or the edge computing device 13. The above production data may comprise, for example but not limited to, serial number, part number, procedure, date, time, machine, abnormal status, message, and completion status. The above sensing data may comprise, for example but not limited to, voltage, current, temperature, humidity, and pressure.

The cloud server 11, the edge computing device 13, and the gateway 15 may transmit data and/or exchange control messages with each other through various wired or wireless connection interfaces. The related operation flows of data transmission and message transmission performed by the cloud server 11, the edge computing device 13, and the gateway 15 in the data transmission system 1 will be explained below with reference to FIG. 2 and FIG. 3.

Figure 2:
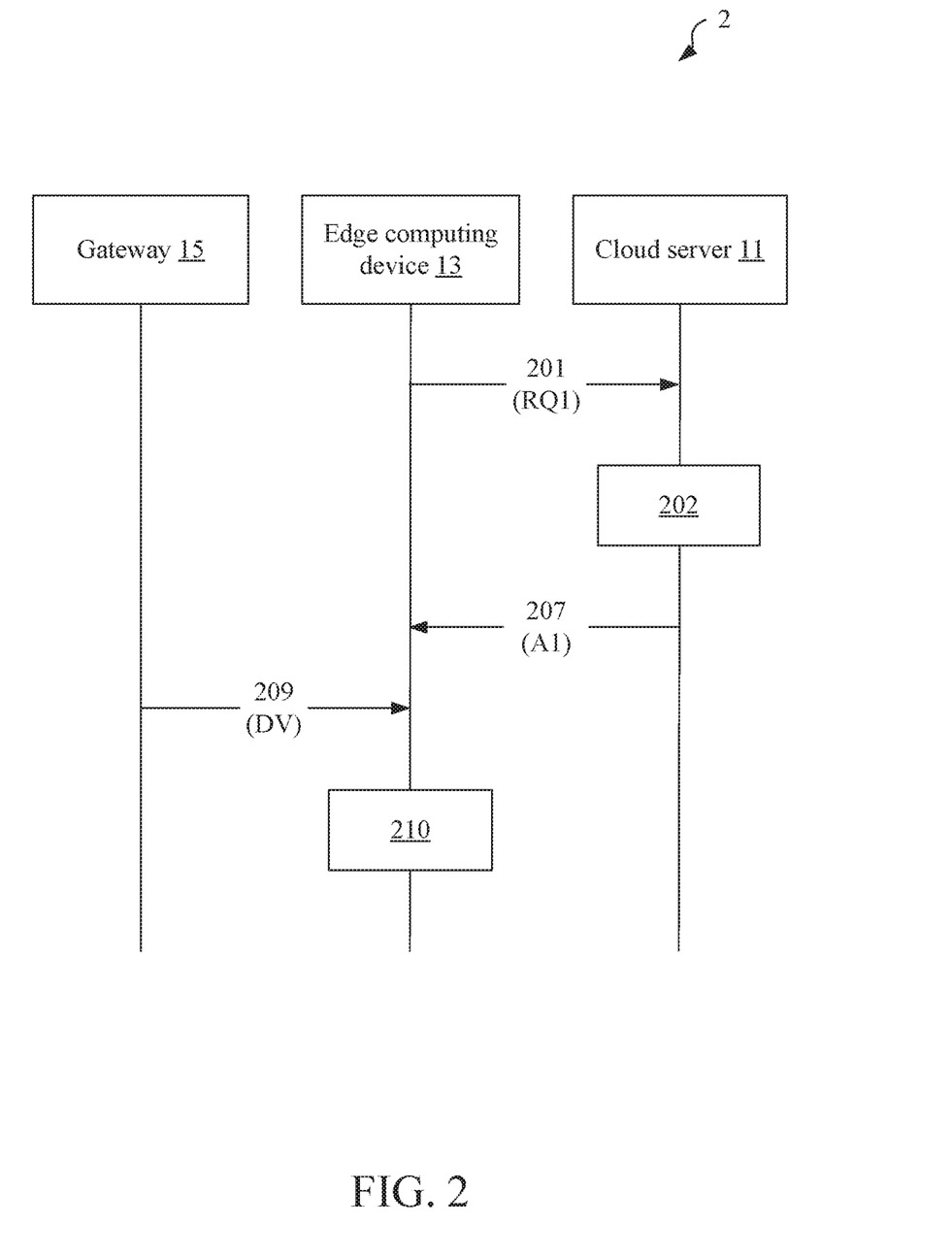
FIG. 2 is a schematic view illustrating how to perform data transmission by a data transmission system according to some embodiments of the present disclosure.
Figure 3:
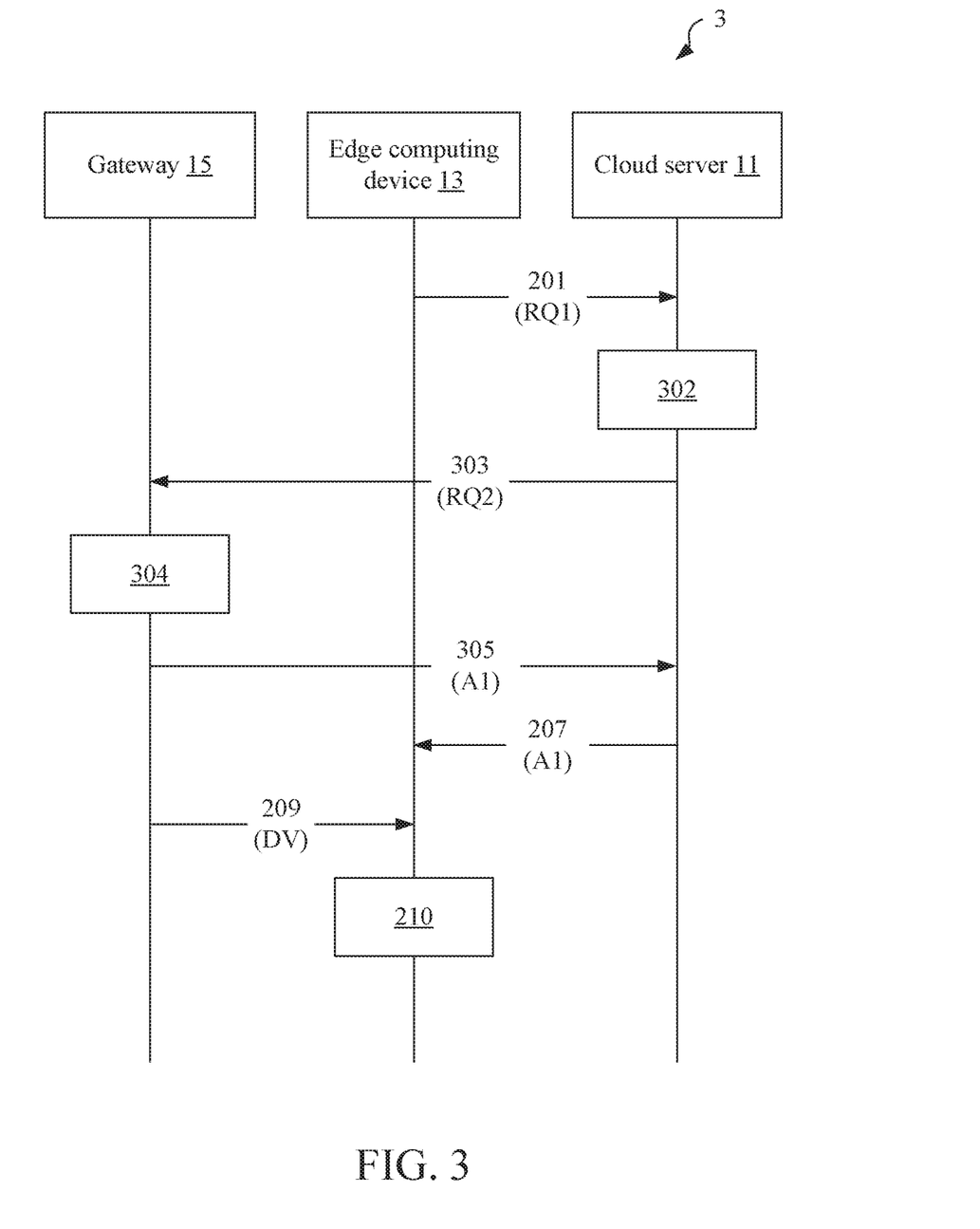
FIG. 3 is a schematic view illustrating how to perform another kind of data transmission by a data transmission system according to some embodiments of the present disclosure.

FIG. 2 and FIG. 3 illustrate how to transmit data by the data transmission system in two different situations respectively according to some embodiments of the present disclosure. In detail, FIG. 2 illustrates the situation where the cloud server 11 has pre-stored the relevant information of the required target schema, while FIG. 3 illustrates the situation where no relevant information of the required target schema is stored in the cloud server 11. The contents shown in FIG. 2 and FIG. 3 are only for illustrating the embodiments of the present disclosure, but not for limiting the scope of the claimed invention.

First, referring to FIG. 2, in the data transmission operation 2, the edge computing device 13 transmits a data receiving request message RQ1 related to a target schema to the cloud server 11 (labeled as action 201). The edge computing device 13 may transmit the data receiving request message RQ1 on a control channel. The edge computing device 13 transmits the data receiving request message RQ1 to the cloud server 11 to request the cloud server 11 to allow the edge computing device 13 to receive data from the gateway 15, and the data conforms to the format of the target schema.

The data receiving request message RQ1 may comprise, for example but not limited to, at least one of the schema structure S1 of the target schema, the corresponding identification number of the target schema, the corresponding identification number of the gateway to receive data, the corresponding identification number of the filter and the filter content thereof. For example, a certain data receiving request message RQ1 may be "{"Gateway": "G1", "Schema": "S01", "Filter": null}", and this data receiving request message RQ1 may indicate that the corresponding identification number of the gateway 15 is "G1", the corresponding identification number of the target schema is "S01", and there is no "Filter".

For example, the edge computing device 13 requests the cloud server 11 to receive data such as "ID (serial number)", "value" and "label" or the like from the gateway 15, and the schema structure S1 of the target schema may be expressed as follows:

{"ID": int, {"value": float, "label": string}} wherein, "'ID'", "'value'", and "'label'" are three labels of the target schema, and the data types of the data values DV sequentially corresponding to the three labels are "int (integer)", "float (floating point number)" and "string".

After receiving the data receiving request message RQ1, the cloud server 11 may confirm that there is relevant information of the corresponding target schema in the schema database 111 thereof (labeled as action 202). In some embodiments, the relevant information of the target schema may comprise, for example but not limited to, at least one of the corresponding identification number of the gateway 15, the transmission address A1 used by the gateway 15 to transmit data corresponding to the target schema, the corresponding identification number of the target schema, the schema structure S1 of the target schema, the corresponding identification number of the filter, the corresponding identification number/identifier of the edge computing device 13.

When the cloud server 11 confirms that there is relevant information of the corresponding target schema in the schema database 111 thereof, it may transmit the transmission address A1 to the edge computing device 13 (labeled as action 207). After receiving the transmission address A1, the edge computing device 13 receives at least one data value DV corresponding to at least one label of the target schema from the gateway 15 according to the transmission address A1 (labeled as action 209).

The gateway 15 may transmit the at least one data value DV described above through a data channel. The data channel may be one of a unicast channel, a multicast channel, and a broadcast channel. When the gateway 15 transmits data in a unicast manner through a unicast channel, the transmission address A1 may be a unicast address. When the gateway 15 transmits data in a multicast manner through a multicast channel, the transmission address A1 may be a multicast address. When the gateway 15 transmits data in a broadcast manner through a broadcast channel, the transmission address A1 may be a broadcast address.

Any device that knows the transmission address A1 may receive the data transmitted by the gateway 15 according to the transmission address A1. For example, the transmission address A1 may be the multicast address "239.0.0.1" of the gateway 15. After receiving the transmission address A1, the edge computing device 13 may receive at least one data value DV corresponding to at least one label of the target schema transmitted by the gateway 15 in the multicast manner according to the multicast address "239.0.0.1".

The gateway 15 may receive the production data provided by the machine tool equipment in the industrial field or the sensing data provided by the sensor installed in the industrial field according to the content in the target schema, convert these production data and/or sensing data into a data value set corresponding to the target schema, and transmit the data value set on the data channel.

Taking the case where the schema structure S1 of the above-mentioned target schema is defined as "{"ID": int, {"value": float, "label": string}}" as an example, the gateway 15 may transmit the corresponding data value set in the multicast manner. For example, the gateway may transmit three data value sets "{10, {15.0, "volt"}}", "{12, {30.1, "temp"}}", and "{15, {5.2, "amp"}}", each of which sequentially comprises three data values respectively corresponding to three labels of the target schema. Taking the data value set "{10, {15.0, "volt"}}" as an example for illustration, it sequentially comprises the data value "10" corresponding to the label "'ID'", the data value "15.0" corresponding to the label "'value'", and "'volt'" corresponding to the label "'label'".

Then, the edge computing device 13 may generate a target data corresponding to the target schema according to the at least one label and the at least one data value DV (labeled as action 210). Details of the action 210 will be described later.

Next, referring to FIG. 3, different from the data transmission operation 2 of FIG. 2, in the data transmission operation 3, the cloud server 11 confirms that there is no relevant information of the corresponding target schema in the schema database 111 thereof (labeled as action 302) when the action 201 ends, i.e., after the cloud server 11 receives the data receiving request message RQ1.

In addition, in response to the cloud server 11 confirming that there is no relevant information of the corresponding target schema in the schema database 111 thereof, the data transmission operation 3 additionally comprises the following actions: the cloud server 11 transmits a data transmission request message RQ2 related to the target schema to the gateway 15 (labeled as action 303); optionally, in response to receiving the data transmission request message RQ2, the gateway 15 establishes a data channel to transmit the at least one data value on the data channel, wherein the data channel corresponds to the transmission address A1 (labeled as action 304); and in response to receiving the data transmission request message RQ2, the gateway 15 returns the transmission address A1 to the cloud server 11 (labeled as action 305).

In the action 303, the cloud server 11 may transmit a data transmission request message RQ2 on a control channel. Through the data transmission request message RQ2, the cloud server 11 may request the gateway 15 for the corresponding transmission address A1 used by the gateway 15 to transmit the data related to the target schema. The data transmission request message RQ2 may comprise, for example but not limited to, at least one of a request parameter, the schema structure S1 of the target schema, and the corresponding identification number of the target schema.

For example, a certain data transmission request message RQ2 may be "{"new data channel request": 1, "Schema": {"ID": int, {"value": float, "label": string} } }", and this data transmission request message RQ2 may indicate that the cloud server 11 requests the gateway 15 to establish a new data channel by setting the value of a request parameter "new data channel request" to be "1", and the data transmitted by the new data channel is the data value DV of the schema structure S1 "{"ID": int, {"value": float, "label": string}}" corresponding to the target schema.

In the action 304, in response to receiving the aforesaid data transmission request message RQ2, the gateway 15 may establish a new data channel according to the contents in the target schema, so as to transmit the at least one data value (i.e., the e data value set) on the data channel.

In the action 305, the gateway 15 may transmit a response message through the control channel, and carry the transmission address A1 in the response message to provide the transmission address A1 to the cloud server 11. For example, a certain response message may be "{"new data channel reply", "239.0.0.1"}", and this response message may indicate that the gateway responds to the request of the cloud server 11 and the transmission address A1 is "239.0.0.1".

Each of the above-mentioned data receiving request message RQ1 transmitted by the edge computing device 13 to the cloud server 11, the data transmission request message RQ2 transmitted by the cloud server 11 to the gateway 15, and the response message transmitted by the gateway 15 to the cloud server 11 may be called a "control messages". Each of the control messages may be transmitted on a control channel, and each of the control channels may perform one-to-one transmission in the unicast manner, but it is not limited thereto.

In some embodiments, in the action 305, in response to different demands (for example, but not limited to, registration demands), the gateway 15 may further transmit the schema structure S1 of the target schema to the cloud server 11 in addition to transmitting the transmission address A1 to the cloud server 11.

In some embodiments, the action 304 may be selectively performed. If the data channel corresponding to the target schema already exists when the gateway 15 receives the data transmission request message RQ2, the gateway 15 may not execute the action 304, but directly execute the action 305 to return the transmission address A1 corresponding to the data channel to the cloud server 11.

In some embodiments, after the action 305 is completed (i.e., after the cloud server 11 receives the transmission address A1 provided by the gateway 15), the cloud server 11 may store the transmission address A1 in the schema database 111 and establish the relevance between the transmission address A1 and the target schema (e.g., the corresponding identification number or the schema structure S1 of the target schema).

In some embodiments, the schema database 111 of the cloud server 11 may provide "Registration function". In detail, the edge computing device 13 or the gateway 15 may submit a registration message to the cloud server 11, and meanwhile cause the schema structure of the schema to be registered to the cloud server 11. Then, in response to receiving the registration message, the cloud server 11 may define a corresponding identification number for the schema, store the schema structure of the schema in the schema database 111, and return the identification number of the schema to the edge computing device 13 or the gateway 15.

In addition to the above-mentioned "Registration function", in some embodiments, the schema database 111 of the cloud server 11 may also provide "Delete function". In detail, when the schema database 111 of the cloud server 11 has the schema structure S1 of the target schema stored therein, the cloud server 11 may further delete the schema structure S1 of the target schema stored in the schema database 111 of the cloud server 11 in response to receiving a delete message for the target schema from the edge computing device 13 or the gateway 15.

In addition to the above-mentioned "Registration function", in some embodiments, the schema database 111 of the cloud server 11 may also provide "Query function". In detail, when the schema database 111 of the cloud server 11 has the schema structure S1 of the target schema stored therein, the cloud server 11 may further provide the schema structure S1 of the target schema to the edge computing device 13 or the gateway 15 in response to the requirements of the edge computing device 13 or the gateway 15.

Figure 4:
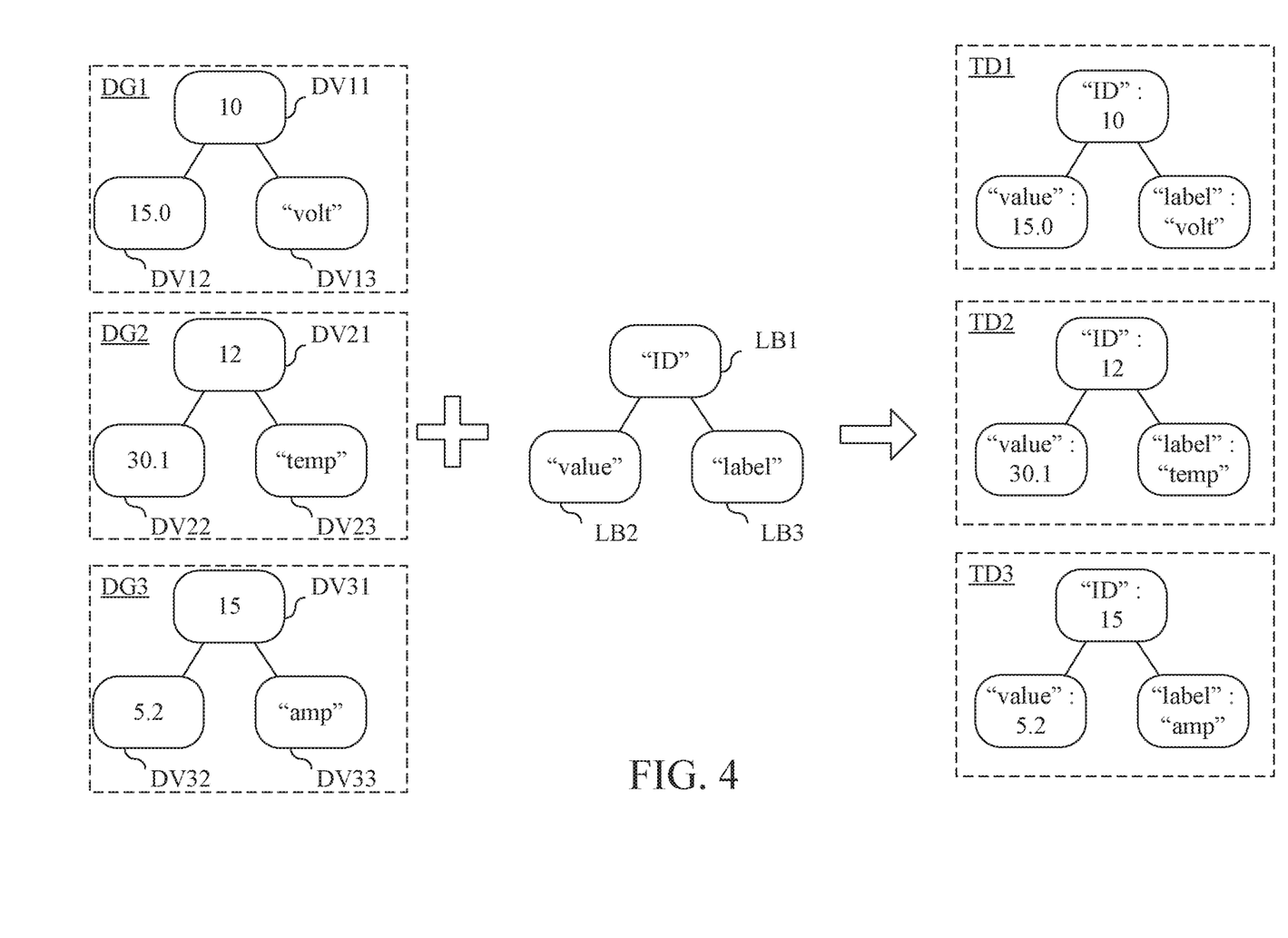
FIG. 4 is a schematic view illustrating how to generate target data by a data transmission system according to some embodiments of the present disclosure.

FIG. 4 illustrates the implementation details of the action 210 illustrated in FIG. 2 and FIG. 3. FIG. 4 is a schematic view illustrating how to generate target data by a data transmission system according to some embodiments of the present disclosure. However, the contents shown in FIG. 4 are only for illustrating embodiments of the present disclosure, but not for limiting the scope of the claimed invention.

Referring to the embodiment shown in FIG. 4, in the action 210 shown in FIG. 2 and FIG. 3, the edge computing device 13 combines the at least one label and the at least one data value to generate the target data conforming to the schema structure S1 of the target schema. The target data may be semi-structured data, for example but not limited to, CSV data, JSON data, and XML, data. In the embodiments illustrated in FIG. 4, the processing of JSON data will be taken as an example for illustration.

In detail, in the embodiments where the schema structure S1 of the target schema is "{"ID": int, {"value": float, "label": string}}", the edge computing device 13 may sequentially receive a data value set DG1 "{10, {15.0, "volt"} }", a data value set DG2 "{12, {30.1, "temp"}}", a data value set DG3 "{15, {5.2, "amp"}}" corresponding to the target schema from the gateway 15. Each of the data value set DG1, the data value set DG2, and the data value set DG3 contains three data values respectively corresponding to three labels (i.e., a label LB1 "'ID'", a label LB2 "'value'", and a label LB3 "'label'") in the target schema. The data value set DG1 comprises a data value DV11 "10", a data value DV12 "15.0", and a data value DV13 "'volt'". The data value set DG2 comprises a data value DV21 "12", a data value DV22 "30.1", and a data value DV23 "'temp'". The data value set DG3 comprises a data value DV31 "15", a data value DV32 "5.2", and a data value DV33 "'amp'".

For each data value set received from the gateway 15, the edge computing device 13 combines the three labels with the corresponding data values respectively to generate the corresponding target data. For example, for the data value set DG1, the edge computing device 13 combines the label LB1 "'ID'", the label LB2 "'value'", and the label LB3 "'label'" respectively with the data value DV11 "10", the data value DV12 "15.0", and the data value DV13 "'volt'" in sequence to generate a target data TD1 "{"ID": 10, {"value": 15.0, "label": "volt"}}". By analogy, the edge computing device 13 may generate a target data TD2 "{"ID": 12, {"value": 30.1, "label": "temp"}}" and a target data TD3 "{"ID": 15, {"value": 5.2, "label": "amp"}}" in the same manner.

Through the above operations, the edge computing device 13 may generate the target data TD1, the target data TD2, and the target data TD3 that conform to the schema structure S1 of the target schema (which conforms to the JSON data format).

Figure 5:
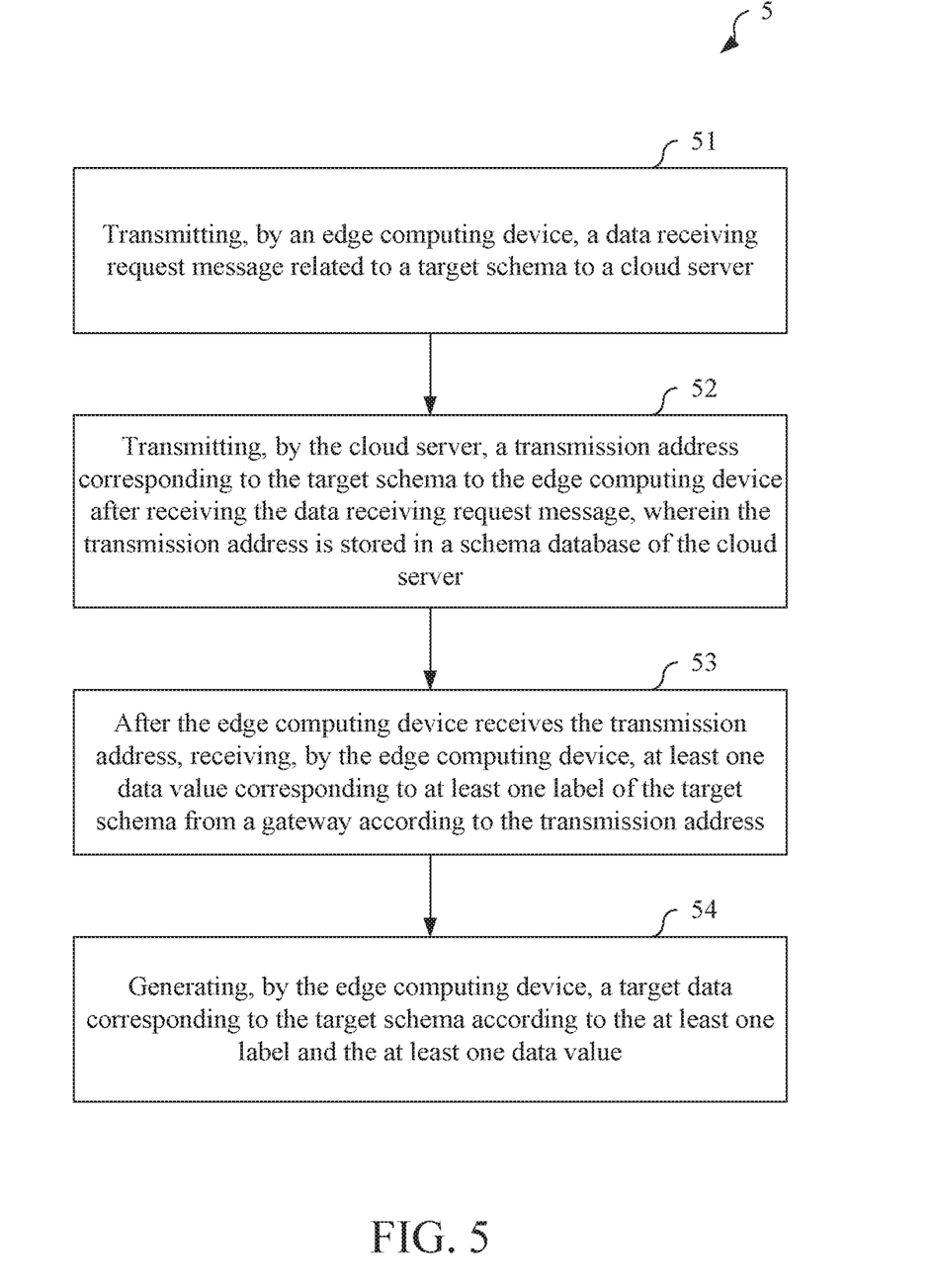
FIG. 5 illustrates a schematic view of a data transmission method according to some embodiments of the present disclosure.

FIG. 5 illustrates a schematic view of a data transmission method according to some embodiments of the present disclosure. However, the contents shown in FIG. 5 are only for illustrating embodiments of the present disclosure, but not for limiting the scope of the claimed invention.

Referring to FIG. 5, the data transmission method 5 may comprise the following steps: transmitting, by an edge computing device, a data receiving request message related to a target schema to a cloud server (labeled as step 51);

transmitting, by the cloud server, a transmission address corresponding to the target schema to the edge computing device after receiving the data receiving request message, wherein the transmission address is stored in a schema database of the cloud server (labeled as step 52); after the edge computing device receives the transmission address, receiving, by the edge computing device, at least one data value corresponding to at least one label of the target schema from a gateway according to the transmission address (labeled as step 53); and generating, by the edge computing device, a target data corresponding to the target schema according to the at least one label and the at least one data value (labeled as step 54).

In some embodiments, in addition to the steps 51 to 54, the data transmission method 5 may further comprise the following steps: transmitting, by the cloud server, a data transmission request message related to the target schema to the gateway; and returning, by the gateway, the transmission address to the cloud server in response to receiving the data transmission request message.

In some embodiments, in addition to the steps 51 to 54, the data transmission method 5 may further comprise the following steps: transmitting, by the cloud server, a data transmission request message related to the target schema to the gateway; and returning, by the gateway, the transmission address to the cloud server in response to receiving the data transmission request message. Before returning the transmission address to the cloud server, the gateway establishes a data channel in response to receiving the data transmission request message to transmit the at least one data value on the data channel, wherein the data channel corresponds to the transmission address.

In some embodiments, the edge computing device combines the at least one label and the at least one data value to generate the target data conforming to the schema structure of the target schema.

In some embodiments, the target data is semi-structured data.

In some embodiments, the transmission address is one of a unicast address, a multicast address, and a broadcast address.

In some embodiments, the schema database further stores a schema structure of the target schema.

In some embodiments, the schema database further stores a schema structure of the target schema, and the schema structure of the target schema is obtained by the cloud server from the edge computing device or the gateway in advance.

In some embodiments, the schema database further stores a schema structure of the target schema, and in addition to the steps 51 to 54, the data transmission method 5 may further comprise the following step: transmitting, by the cloud server, the schema structure of the target schema to the edge computing device or the gateway.

In some embodiments, the schema database further stores a schema structure of the target schema, and in addition to the steps 51 to 54, the data transmission method 5 may further comprise the following step: deleting, by the cloud server, the schema structure of the target schema stored in the schema database in response to receiving a delete message for the target schema from the edge computing device or the gateway.

Each embodiment of the data transmission method 5 essentially corresponds to a certain embodiment of the data transmission system 1. Therefore, even though each embodiment of the data transmission method 5 is not described in detail above, embodiments of the data transmission method 5 which are not detailed shall be directly appreciated by a person having ordinary skill in the art based on the above description for the data transmission system 1.

The above disclosure is related to the detailed technical contents and inventive features thereof for some embodiments of the present invention, but such disclosure is not to limit the present invention. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A data transmission system, comprising:
a cloud server, comprising a schema database, the schema database is configured to store a transmission address corresponding to a target schema;
an edge computing device, being electrically connected to the cloud server, and being configured to transmit a data receiving request message related to the target schema to the cloud server; and
a gateway, being electrically connected to the cloud server and the edge computing device;
wherein the cloud server is configured to transmit the transmission address to the edge computing device after receiving the data receiving request message, and after the edge computing device receives the transmission address, the edge computing device is further configured to receive at least one data value corresponding to at least one label of the target schema from the gateway according to the transmission address, and generate a target data corresponding to the target schema according to the at least one label and the at least one data value.

2. The data transmission system of claim 1, wherein the cloud server is further configured to transmit a data transmission request message related to the target schema to the gateway, and the gateway is configured to return the transmission address to the cloud server in response to receiving the data transmission request message.

3. The data transmission system of claim 2, wherein before the gateway returns the transmission address to the cloud server, the gateway is further configured to establish a data channel in response to receiving the data transmission request message to transmit the at least one data value on the data channel, wherein the data channel corresponds to the transmission address.

4. The data transmission system of claim 1, wherein the edge computing device is further configured to combine the at least one label and the at least one data value to generate the target data conforming to a schema structure of the target schema.

5. The data transmission system of claim 1, wherein the target data is semi-structured data.

6. The data transmission system of claim 1, wherein the transmission address is one of a unicast address, a multicast address, and a broadcast address.

7. The data transmission system of claim 1, wherein the schema database is further configured to store a schema structure of the target schema.

8. The data transmission system of claim 7, wherein the schema structure of the target schema is obtained by the cloud server from the edge computing device or the gateway in advance.

9. The data transmission system of claim 7, wherein the cloud server is further configured to transmit the schema structure of the target schema to the edge computing device or the gateway.

10. The data transmission system of claim 7, wherein the cloud server is further configured to delete the schema structure of the target schema stored in the schema database in response to receiving a delete message for the target schema from the edge computing device or the gateway.

11. A data transmission method, comprising:
   transmitting, by an edge computing device, a data receiving request message related to a target schema to a cloud server;
   transmitting, by the cloud server, a transmission address corresponding to the target schema to the edge computing device after receiving the data receiving request message, wherein the transmission address is stored in a schema database of the cloud server;
   after the edge computing device receives the transmission address, receiving, by the edge computing device, at least one data value corresponding to at least one label of the target schema from a gateway according to the transmission address; and
   generating, by the edge computing device, a target data corresponding to the target schema according to the at least one label and the at least one data value.

12. The data transmission method of claim 11, further comprising:
   transmitting, by the cloud server, a data transmission request message related to the target schema to the gateway; and
   returning, by the gateway, the transmission address to the cloud server in response to receiving the data transmission request message.

13. The data transmission method of claim 12, further comprising:
   before the gateway returns the transmission address to the cloud server, establishing, by the gateway, a data channel in response to receiving the data transmission request message to transmit the at least one data value on the data channel, wherein the data channel corresponds to the transmission address.

14. The data transmission method of claim 11, wherein the edge computing device combines the at least one label and the at least one data value to generate the target data conforming to the schema structure of the target schema.

15. The data transmission method of claim 11, wherein the target data is semi-structured data.

16. The data transmission method of claim 11, wherein the transmission address is one of a unicast address, a multicast address, and a broadcast address.

17. The data transmission method of claim 11, wherein the schema database further stores a schema structure of the target schema.

18. The data transmission method of claim 17, wherein the schema structure of the target schema is obtained by the cloud server from the edge computing device or the gateway in advance.

19. The data transmission method of claim 17, further comprising:
   transmitting, by the cloud server, the schema structure of the target schema to the edge computing device or the gateway.

20. The data transmission method of claim 17, further comprising:
   deleting, by the cloud server, the schema structure of the target schema stored in the schema database in response to receiving a delete message for the target schema from the edge computing device or the gateway.

* * * * *